March 25, 1958 A. STECKER ET AL 2,828,421
FREQUENCY MODULATION TUNING INDICATOR
Filed July 21, 1954
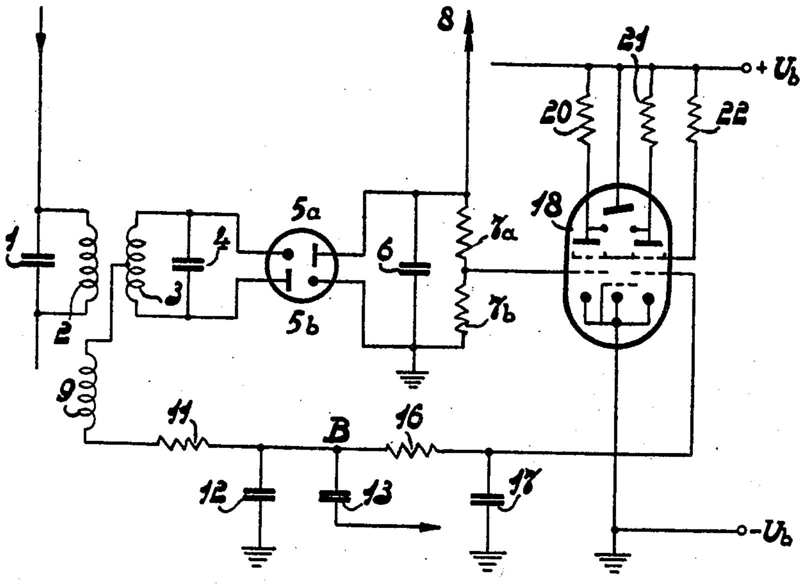
INVENTORS
ALBERT STECKER
HEINZ BOCK
BY [signature]
AGENT United States Patent Office 2,828,421

Patented Mar. 25, 1958

2,828,421

FREQUENCY MODULATION TUNING INDICATOR

Albert Stecker, Hamburg-Lockstedt, and Heinz Bock, Hamburg, Germany, assignors, by mesne assignments, to North American Philips Company, Inc., New York, N. Y., a corporation of Delaware Application July 21, 1954, Serial No. 444,872

Claims priority, application Germany July 31, 1953

2 Claims. (Cl. 250—40)

This invention relates to a circuit arrangement for the indication of tuning in receivers for frequency-modulated oscillations by means of cathode-ray tuning indicator tubes comprising two relatively independent control-members with the use of asymmetrical ratio-detector circuits. Such a circuit arrangement is described in U. S. Patent No. 2,784,316, issued March 5, 1957.

In such circuit-arrangements allowance is made for the fact that in modern receiving tubes it is common practice and in view of the cost of the complete receiver unavoidable to incorporate the diode systems for the ratio detector in the envelope of another amplifying tube (for example a tube of the EABC type). More particularly on account of the limited number of cap pins, it is impossible to provide two diodes having independent cathodes for the ratio detector, so that symmetric discriminator circuits cannot be used. However, unilateral grounding of the ratio detector (asymmetrical connection) is also desirable in view of the fact that an amplification control voltage (rectified intermediate-frequency oscillation) may thus be derived from the anode of the diode having a non-grounded cathode, which amplification control voltage is twice as high as that available in a symmetrical arrangement. It is thus possible to obtain better suppression of fading. These factors, as well as other factors, will cause an unbalance in the circuit which results in the characteristic curve of the output signal being asymmetrical, i. e. this output curve is not centered symmetrically about the zero-voltage axis at the central frequency. Such a characteristic is shown by the curve *a* in Fig. 2 of the patent referred to above, whereas a symmetrical characteristic is shown by the curve *b* in Fig. 2 of this reference patent. Other factors which can cause an asymmetrical characteristic curve, are an unbalance of the transformer, diodes, or circuit constants, as is pointed out by Seeley and Avins in their article "The Ratio Detector" in RCA Review, vol. VIII, No. 2, June 1947, pages 201 to 236, particularly from the fourth to last line on page 225 to line 6 on page 226.

However, for the indication of tuning, the asymmetrical ratio-detector circuit involves the difficulty that the output voltage from which the low-frequency oscillation is derived comprises not only the direct-voltage component originating from the detuning (detuning voltage), but also an amplification control-voltage component (rectified intermediate-frequency oscillation) which is considerably larger than the detuning voltage (for example, according to the input signal, up to —20 volts with respect to about 2 to 3 volts detuning voltage), so that satisfactory tuning indication cannot be obtained without further expedients.

The said disadvantages are avoided and the detuning voltage is freely made active with the use of a tuning indicator tube comprising two amplifying systems coupled directly to the two deflection members due to the fact that according to the patent referred to above, the ratio-detector voltage including the detuning voltage is applied to the control grid of one amplifying system and the intermediate-frequency voltage rectified in the ratio detector is applied to the control grid of the other amplifying system.

However, difficulties occur due to the amplifying systems having to be still sufficiently active in the full control range (0 to 30 volts) which is substantially determined by the rectified intermediate-frequency voltage. This may be approximately ensured by a particular construction of the amplifying systems, which are usually in the form of triodes, and high anode resistances (sliding anode voltage). However, since in the case of small triodes as may be used for tuning indicator tubes and with a large control range the maximum mutual conductance and hence the sensitivity has also decreased to a noticeable extent, such a solution is not always satisfactory in practice.

Material improvements are obtained in a circuit according to the patent referred to above, comprising a tuning indicator tube having two relatively independent amplifying systems coupled directly to the two deflection members if, according to the present invention, the amplifying systems exhibit variable amplification factor control characteristic curves which preferably are substantially identical.

The control characteristic curve may be obtained, for example, not only by irregular winding of the control grid, but also by providing at least one amplifying system with a screen grid which is connected by way of an unbypassed series-resistance to the source of voltage supply. As a matter of fact, the control characteristic curves may alternatively be obtained by taking the two steps in combination, certain variations in the characteristics still being possible by suitable proportioning of the screen-grid resistance.

The two amplifying systems each preferably comprise a screen grid. The screen grids are interconnected and connected by way of a common unbypassed series-resistor to the source of voltage supply, resulting in an increased indication sensitivity which more particularly is about twice as high as is obtained without the invention.

By proportioning the control characteristic curve and preferably by proportioning the screen-grid resistance it may be ensured that the sensitivity of the device, for example the deviation of a light ray, with unvaried detuning (in kc./s.) is substantially independent of the intermediate-frequency amplitude, so that a satisfactory tuning indication ensues in the same manner for strong and weak signals.

In order that the invention may be readily carried into effect, it will now be described with reference to the accompanying drawing, showing, by way of example, a ratio-detector circuit of known type comprising a tuning indicator circuit according to the invention.

A current comprising the frequency modulation is supplied by the last intermediate-frequency amplifying tube to a circuit 1, 2 and transferred via a preferably loose coupling to a secondary oscillatory circuit 3, 4. Two diodes 5*a* and 5*b* of opposite polarities are connected to the outer connections of the oscillatory circuit 3, 4 in the manner known for asymmetrical ratio detectors, the cathode of the diode 5*b* remote from the circuit 3, 4 being connected to earth. Between the anode of diode 5*a* and earth there are provided the parallel combination of a comparatively large capacitor 6 and a load resistance preferably comprising two substantially identical parts 7*a* and 7*b*. The anode 5*a* of the diode may also have derived from it a voltage 3 for automatic amplification control as indicated by a double arrow.

The centre of coil 3 has connected to it a further coil 9 which is preferably tightly coupled to the coil 2 and from the extremities of which the demodulated low-frequency oscillation occurring at point B may be derived in known manner via an intermediate-frequency smoothing filter 11, 12 and a blocking capacitor 13. Via a low-frequency filter 16, 17, which is not absolutely required, however, since a small low-frequency voltage does not interfere with the tuning indication to any appreciable extent, the rectified intermediate-frequency voltage also occuring at point B (which is equal to about half the control voltage 8) and the detuning voltage desired for the indication are supplied to the control grid of the amplifying system of indicator tube 18 shown at the right-hand side.

Half of the intermediate-frequency voltage 8 rectified by the ratio detector is derived from the junction of the resistors 7*a* and 7*b* and supplied to the other grid of tube 18 (shown at the left-hand side).

The cathode of tube 18 is connected directly to electrical ground and to the negative terminal of the supply battery $U_b$, the anodes of the indicator systems being connected directly to the deflection electrodes or the like and coupled via resistances 20 and 21 to the positive terminal of the battery $U_b$. The fluorescent screen itself is connected in the usual manner directly to the battery voltage $+U_b$.

The amplifying systems are in the form of tetrodes; their screen grids are directly connected together and are connected via a common series-resistance 22 to $+U_b$.

The resistance 22 is so proportioned that a material variation in mutual conductance is obtained in the control range which is primarily determined by the rectified intermediate-frequency voltage (for example from 0 to −20 volts) and for this purpose the "penetration factor" of the screen grids is suitable proportioned and more particularly not unduly small. An increase in the negative input voltage, viz. rectified intermediate-frequency voltage, which is common to the two control grids, results in a decrease in indication sensitivity with respect to the control voltage, since with unvaried detuning in kc./s. the detuning voltage derived from the ratio detector is approximately proportional to the intermediate-frequency amplitude. The indication of detuning is thus found to be substantially independent of the intermediate-frequency amplitude. The direct connection between the two screen grids and the provision of a common series-resistor 22 results in an increase in indication sensitivity, which is important more particularly at low input voltage, since if the right-hand control grid in the case of detuning acquires a smaller negative bias, the anode current in this system increases and the anode voltage decreases as a result of resistance 21. But the screen-grid current of this system also increases and hence the screen-grid voltage decreases, which is transferred to the left-hand system, so that the anode current in this system decreases due to the smaller screen-grid voltage and hence the anode voltage increases. The anode voltages of the two systems are found to vary in opposite senses, resulting in an approximately two-fold amplified indication due to the direct connection between the screen grids of the two systems.

What is claimed is:

1. A tuning indicator system for a frequency modulation receiver, comprising a cathode-ray indicator tube producing a cathode-ray beam and having two deflecting members and two amplifying systems, said amplifying systems having output electrodes coupled respectively to said deflecting members and each having a control grid, each of said amplifying systems including a screen grid interposed between the control grid and the output electrode thereof, a source of voltage, unbypassed resistance means connecting said screen grids to said source of voltage thereby to render said amplifying systems non-linear so that the amplification factor of each of said amplifying systems varies inversely with respect to changes in magnitude of an input voltage applied to the control grid thereof, an unbalanced ratio detector having an output voltage characteristic which is asymmetric about the central frequency thereof, thereby producing an output voltage of given value and polarity when a frequency modulated wave having a nominal frequency equal to said central frequency is applied to said detector, said output voltage comprising a first component of magnitude and polarity varying in accordance with the departure of the nominal frequency of said frequency modulated wave from said central frequency and a second component of predetermined polarity and of magnitude varying in accordance with the magnitude of said frequency modulated wave, said second component comprising a rectified voltage, means connected to apply said output voltage to the control grid of one of said amplifying systems whereby said output voltage is amplified and applied to the corresponding one of said deflecting members, means connected to produce a second voltage having a magnitude proportional to that of said second component, and means connected to apply said second voltage to the control grid of the other of said amplifying systems whereby said second voltage is amplified and applied to the corresponding other one of said deflecting members, whereby the difference between the amplified output voltage and the amplified second voltage is equal to zero when the said nominal frequency of said wave is equal to the said central frequency of said detector chracteristic.

2. A system as claimed in claim 1, in which said screen grids are connected electrically together and in which said unbypassed resistance mean comprises a single unbypassed resistor connected at an end thereof to said screen grids and connected at the other end thereof to said source of voltage.

References Cited in the file of this patent

UNITED STATES PATENTS

| | | |
|---|---|---|
| 2,347,977 | Van Lieshout | May 2, 1944 |
| 2,502,293 | Vilkomerson | Mar. 28, 1950 |
| 2,606,290 | Van Wageningen | Aug. 5, 1952 |
| 2,784,316 | Te Gude | Mar. 5, 1957 |